Patented Feb. 19, 1924.

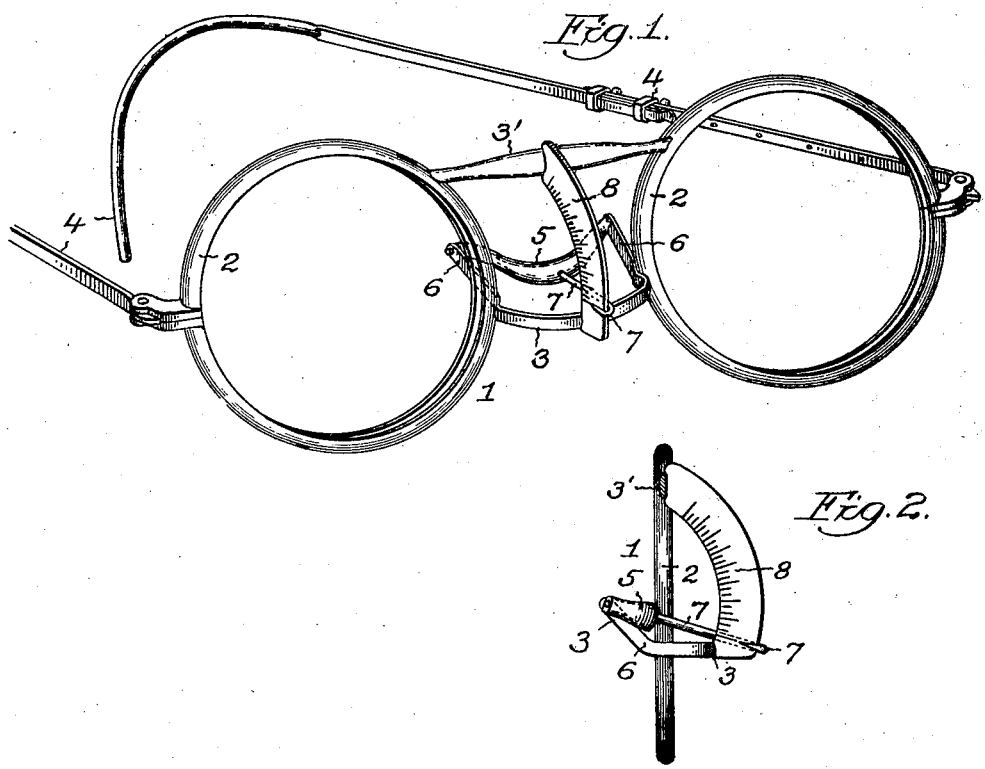

1,484,364

UNITED STATES PATENT OFFICE.

WILLIAM R. UHLEMANN, OF EVANSTON, ILLINOIS, ASSIGNOR TO UHLEMANN OPTICAL COMPANY, OF CHICAGO, ILLINOIS, A CORPORATION OF ILLINOIS.

ANGLE-MEASURING INSTRUMENT.

Application filed March 6, 1922. Serial No. 541,278.

*To all whom it may concern:*

Be it known that I, WILLIAM R. UHLEMANN, a citizen of the United States of America, residing at Evanston, in the county of Cook and State of Illinois, have invented a certain new and useful Improvement in Angle-Measuring Instruments, of which the following is a specification.

This invention relates to opticians' measuring appliances for determining or gaging the proper angle at which the plane of the resting surface of the nose bridge of the eyeglass frames is to be set with relation to the plane of the lenses in order to afford a proper fit to the angle of the nose of the particular user, and the present improvement has for its object:—

To provide a structural formation and combination of parts in a measuring instrument capable of ready and convenient application and adapted to afford an accurate indication of the angle of the nose of the party being measured for the guidance of the optician in accurately fitting or adjusting the eyeglass intended for such person, all as will hereinafter more fully appear.

In the accompanying drawing:

Fig. 1, is a perspective view illustrating the general arrangement of parts in primary and preferred form of the present invention.

Fig. 2, is a central transverse sectional elevation of the same.

Like reference numerals indicate like parts in both views.

Referring to the drawing, 1 designates the main frame of the instrument having the usual pair of holding rings for lenses or the like, connected together in spaced relation by connecting frame 3 of the yoke form shown, with the respective outer sides of said rings 2 carrying hinged temple bars 4 adapted to engage around the ears of the person being fitted to hold the instrument in place.

5 designates a gage piece at an arched or curved form and having a flat elliptical shape in cross section corresponding with that usually employed in the nose bridges of eyeglass and spectacle mountings. The gage piece 5 is pivotally mounted at its respective transverse ends of the side bars of the connecting frame 3 aforesaid, in central relation to the pair of lens holding rings 2 and is adapted to rest upon the nose of the person to be fitted and support the rings 2 and the lenses carried thereby in proper position before the eyes of such person. The described pivotal arrangement of the gage piece 5 provides a substantial and rigid connection of the parts adapted to resist any tendency to lateral sway of the gage piece and parts carried thereby, in actual use.

3' designates a supplementary connecting rail between the lens holding rings 2 to afford additional rigidity to the frame structure.

7 designates a pointer or index finger moving with the gage piece 5 in its pivotal adjustment in a fitting or angle measuring operation and adapted to indicate on a graduated index plate 8 carried by the connecting frame 3, the angle of inclination which the bearing surface of the gage piece 5 has assumed in relation to the plane of the lens holding rings 2 in reaching a proper rest upon the nose of the person being fitted, thus affording a correct indication and guide in fitting a suitable eyeglass or spectacle frame for such user and by means of the testing instrument which constitutes the subject matter of my companion application for patent, Serial No. 541,274, filed March 6, 1922.

Having thus fully described my invention, what I claim as new and desire to secure by Letters Patent, is:—

1. In an instrument for indicating the angle of the resting surface of the nose bridge with relation to the plane of the lens rings of an eyeglass frame, the combination of a pair of lens holding rings, temple bars attached to said rings, a transverse frame of a yoke shape connecting said lens rings in spaced relation, a gage piece pivotally mounted at its respective ends in the ends of said yoke shape frame and adapted for bearing upon the nose of the person being fitted, a pointer moving with said gage piece, and a graduated scale carried by the transverse frame.

2. In an instrument for indicating the angle of the resting surface of the nose bridge with relation to the plane of the lens rings of an eyeglass frame, the combination of a pair of lens holding rings, temple bars attached to said rings, a transverse frame connecting said lens rings in spaced relation and having a U shaped form, a gage piece pivotally mounted at its respective ends in the ends of said yoke shape frame and adapted for bearing upon the nose of the person being fitted, a supplementary rail connecting the upper parts of the holding rings together, a pointer moving with said gage piece, and a graduated scale carried by the transverse frame.

Signed at Chicago, Illinois, this 1st day of March 1922.

WILLIAM R. UHLEMANN.